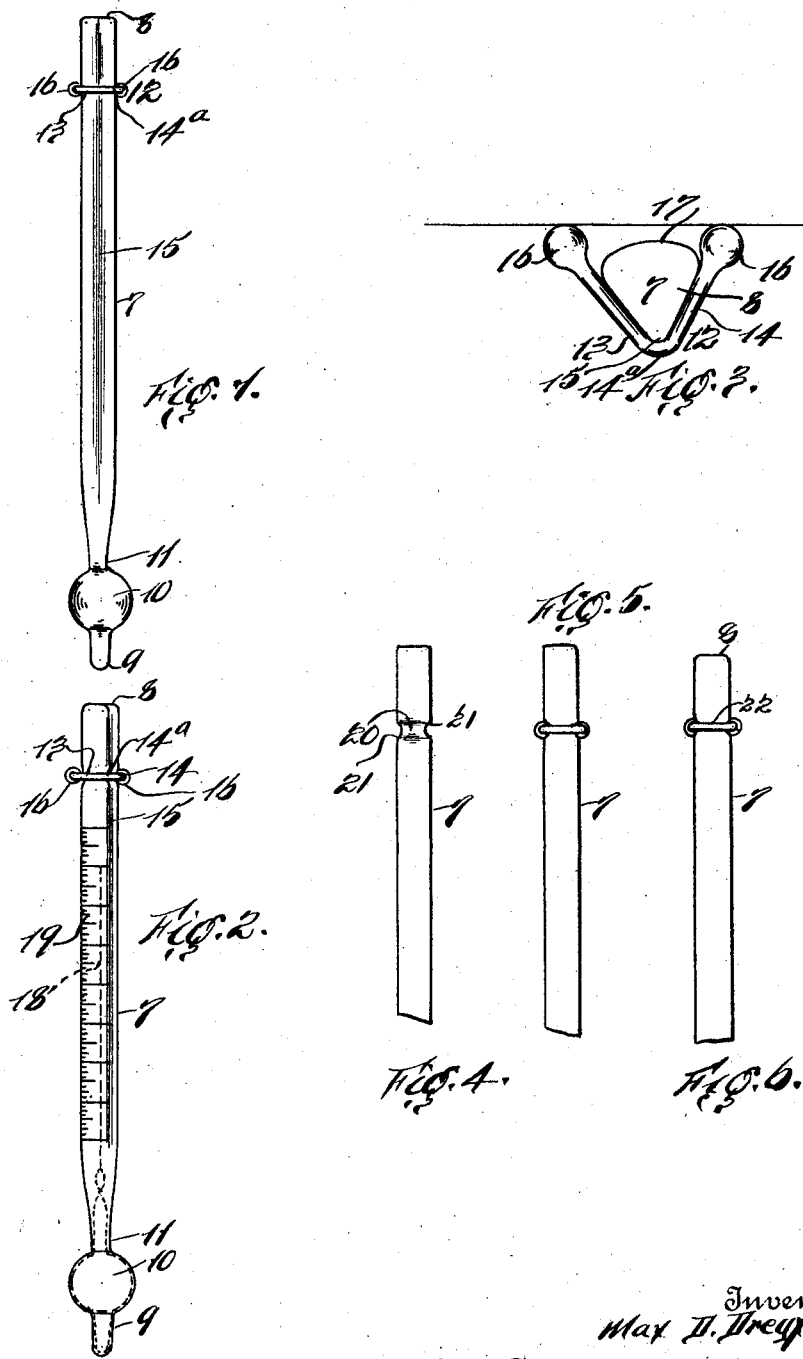

UNITED STATES PATENT OFFICE.

MAX D. DREYFUS, OF NEW YORK, N. Y.

CLINICAL THERMOMETER.

1,391,881.  Specification of Letters Patent.  Patented Sept. 27, 1921.

Application filed October 18, 1920. Serial No. 417,628.

*To all whom it may concern:*

Be it known that I, MAX D. DREYFUS, a citizen of the United States of America, residing at New York city, county and State of New York, have invented certain new and useful Improvements in Clinical Thermometers, of which the following is a full, clear, and exact description.

This invention relates to improvements in thermometers of the type used for clinical or veterinary purposes, one of the objects of the invention being to provide an article of this character, which is adapted to be retained in place, when used rectically, by means of a bulbous formation, at the chambered end of the tube, or end containing the mercury.

A further feature of the invention consists of a rib passing partly around the tube to prevent the tube from rolling, an advantageous feature of the rib being to position the tube, when it is laid upon a table or the like, so that the index or graduations can be readily read; that is to say, to position the tube so that the mercury within same will be more readily visible. It is a well known fact that these thermometers have to be held in a certain position in order to see the fine line of mercury under the indexed surface of the tube. By means of the positioning rib, which I employ, the tube will always be positioned, when laid upon a support so that the index can be easily read relatively to the mercury line.

I will now proceed to describe my invention in detail, the novel features of which I will finally point out in the appended claims, reference being had to the accompanying drawing, wherein:—

Figure 1 illustrates my improved thermometer in elevation, the index being omitted;

Fig. 2 illustrates the thermometer as positioned by the positioning rib for reading;

Fig. 3 is an end view, enlarged, looking from the blunt end of the tube;

Figs. 4, 5 and 6 are fragmentary views, illustrating different steps in the application of the rib to the tube.

As herein constructed, my improved thermometer consists of a glass body portion 7, which is blunt at one end, as indicated by 8, and pointed at the opposite end, as indicated by 9. Adjacent the pointed end 9, the body member is enlarged to form a spherical or bulbous portion 10 adjacent to which the said body member is reduced in diameter, as at 11, to form a constricted portion adjacent the bulb to coact therewith to retain the tube or thermometer in position when rectal readings are to be taken, especially in case the instrument is being used for animals. The end 9 aids materially in the insertion of the thermometer. The contraction of the muscles after the thermometer has been inserted, will hold the instrument in place. The bulb 10 will act as a drag to prevent the instrument from being prematurely forced out of place by muscular action. As a matter of fact the flesh will contract and envelop the bulb 10.

A further feature of the invention consists of rib 12 carried by the body 7 and preferably located adjacent the blunt end 8. The rib consists of leg members 13 and 14 joined at the ends as at 14$^a$ to extend over the edge 15 of the tube, which is usually triangular in form. It will be seen in Fig. 3 that the leg 13 is longer than leg 14, the free end of each leg being enlarged as at 16; hence, when the thermometer is laid upon a table, the lens 15 will be located somewhat to one side of a vertical line drawn from the center of surface 17 of the tube, as indicated in Fig. 3. The legs 13 and 14 will be proportioned to position the tube at such angle as to facilitate the reading of the thermometer, the mercury being indicated by 18 and the graduations by 19. When the tube is laid upon a table or the like, the rib 12 also acts to prevent the tube from rolling when laid down. To apply the rib, which like the tube, is made of glass, the tube 7 will, at one end, be drawn, as indicated by 20, Fig. 4, to produce annular shoulders 21. After the shoulders 21 are formed, the rib, which will be preformed, will be slipped over the drawn portion 20 and fitted against the shoulders 21. (See Fig. 5). After the rib has been slipped into place, it will be fused to the body 7. The rib 12 will now be located within an annular recess 22 and cannot be slipped off the tube. The drawing of the tube, and also the fusing of the rib will be accomplished with the aid of heat in the usual manner.

Having described my invention what I claim and desire to secure by Letters Patent is:—

1. In combination with a clinical thermometer of triangular cross section, having an index on one of the walls thereof, means associated with the thermometer arranged to position the wall having the index, when the thermometer is laid upon a support at such angle with respect to said support as to facilitate the reading of the thermometer.

2. In combination with a clinical thermometer of triangular cross section, having an index on one of the walls thereof, means projecting from opposite walls of the thermometer arranged to position the wall having the index, when the thermometer is laid upon a support, at such angle with respect to said support as to facilitate the reading of the thermometer.

3. In combination with a clinical thermometer, having an index, a rib carried thereby consisting of leg members, one leg member being longer than the other, whereby the index portion of the thermometer will be positioned, when the thermometer is laid upon a support, at such angle relative to the support as to facilitate the reading of the thermometer, the longer leg member being located on the indexed surface of the thermometer and extending beyond same.

Signed at New York city, N. Y., this 14 day of October, 1920.

MAX D. DREYFUS.

Witnesses:
MAURICE BLOCK,
EDWARD A. JARVIS.